US012806555B2

(12) United States Patent
Cusack et al.

(10) Patent No.: US 12,806,555 B2
(45) Date of Patent: Nov. 24, 2026

(54) FRONT-LOADED INLINE MODULAR FILTRATION SYSTEM

(71) Applicant: HEALTHWAY HOME PRODUCTS COMPANY INC., Pulaski, NY (US)

(72) Inventors: Timothy George Cusack, Central Square, NY (US); Alexander Thomas Frechette, Mexico, NY (US); Kevin Michael Guernsey, Constantia, NY (US); Mitchell Raymond Lobdell, Constantia, NY (US); Brooke Alan Rowe, Vernon, NY (US); Xuchen Wang, Pulaski, NY (US); Vincent G. Lobdell, Sr., Pulaski, NY (US)

(73) Assignee: HEALTHWAY HOME PRODUCTS COMPANY INC., Pulaski, NY (US)

( * ) Notice: Subject to any disclaimer, the term of this patent is extended or adjusted under 35 U.S.C. 154(b) by 471 days.

(21) Appl. No.: 17/711,734

(22) Filed: Apr. 1, 2022

(65) Prior Publication Data

US 2022/0314155 A1 Oct. 6, 2022

Related U.S. Application Data

(60) Provisional application No. 63/169,529, filed on Apr. 1, 2021.

(51) Int. Cl.

*B01D 46/42* (2006.01)
*B01D 46/00* (2022.01)

(52) U.S. Cl.

CPC ..... *B01D 46/4245* (2013.01); *B01D 46/0005* (2013.01); *B01D 46/0012* (2013.01);

(Continued)

(58) Field of Classification Search

CPC ............ B01D 46/4245; B01D 46/0005; B01D 46/0012; B01D 46/0032; B01D 46/0097;

(Continued)

(56) References Cited

U.S. PATENT DOCUMENTS 6,245,126 B1 6/2001 Feldman et al.
6,387,164 B1 5/2002 Cheng (Continued)

FOREIGN PATENT DOCUMENTS

DE 202007010602 U1 12/2008
JP 5916520 A 1/1984

(Continued)

OTHER PUBLICATIONS

U.S. Appl. No. 17/729,726, filed Apr. 26, 2022, Vincent Lobdell, Disinfecting Air Filtrations System Configuration.

(Continued)

*Primary Examiner* — Qianping He

(74) *Attorney, Agent, or Firm* — BRAKE HUGHES BELLERMANN LLP

(57) ABSTRACT

The present invention is disinfecting air filtration apparatus that allows multiple disinfecting air filtration modules to function in parallel. The apparatus may provide energy to respective parts of a filtration apparatus, such as a V-Bank filter apparatus. The apparatus may also include a front-mounted pre-filter frame that can be secured to other parts of the apparatus without tools. The securing of the pre-filter frame grounds the air filtration module and creates an airtight interface between the air filtration module and the array. Methods consistent with the present disclosure allow for filter apparatus to be connected to or coupled to virtually any size air ducts of an air distribution or a high voltage alternating current air conditioning (HVAC) system.

10 Claims, 8 Drawing Sheets

(52) U.S. Cl.
CPC ..... *B01D 46/0032* (2013.01); *B01D 46/0097* (2013.01); *B01D 2265/028* (2013.01); *B01D 2267/70* (2013.01); *B01D 2271/02* (2013.01); *B01D 2279/50* (2013.01)

(58) Field of Classification Search
CPC ............ B01D 2267/70; B01D 2271/02; B01D 2279/50
USPC .......................................................... 55/350.1
See application file for complete search history.

(56) References Cited

U.S. PATENT DOCUMENTS

| | | | | |
|---|---|---|---|---|
| 7,258,729 | B1 | 8/2007 | Barsimanto et al. | |
| 8,409,336 | B2 | 4/2013 | Gatchell et al. | |
| 9,457,861 | B2 | 10/2016 | Araki et al. | |
| 2002/0056372 | A1 | 5/2002 | O'Hara et al. | |
| 2004/0070156 | A1 | 4/2004 | Smith et al. | |
| 2004/0129140 | A1 | 7/2004 | Park et al. | |
| 2005/0207951 | A1 | 9/2005 | Lee et al. | |
| 2005/0257687 | A1* | 11/2005 | Tanaka | B03C 3/08 96/15 |
| 2006/0079172 | A1 | 4/2006 | Fleming et al. | |
| 2006/0096261 | A1 | 5/2006 | Zhang | |
| 2006/0150816 | A1* | 7/2006 | Jaisinghani | B03C 3/12 96/96 |
| 2007/0036462 | A1 | 2/2007 | Crandall et al. | |
| 2007/0039462 | A1* | 2/2007 | Helt | B03C 3/47 95/79 |
| 2007/0039472 | A1* | 2/2007 | Bias | B03C 3/09 96/77 |
| 2008/0041138 | A1 | 2/2008 | Marra | |
| 2009/0044703 | A1 | 2/2009 | Bias et al. | |
| 2012/0124961 | A1 | 5/2012 | Jarrier et al. | |
| 2014/0353236 | A1 | 12/2014 | Mann | |
| 2015/0246308 | A1 | 9/2015 | Lans | |
| 2017/0246573 | A1 | 8/2017 | Crabtree et al. | |
| 2018/0066779 | A1 | 3/2018 | Jaeger et al. | |
| 2018/0154297 | A1 | 6/2018 | Maletich et al. | |
| 2018/0318747 | A1 | 11/2018 | Poon et al. | |
| 2019/0041079 | A1 | 2/2019 | Kohn et al. | |
| 2019/0117815 | A1 | 4/2019 | Wei et al. | |
| 2019/0234146 | A1 | 8/2019 | Weightman | |
| 2020/0061635 | A1 | 2/2020 | Wiser et al. | |
| 2020/0298160 | A1* | 9/2020 | Jeon | B01D 46/58 |
| 2022/0040625 | A1 | 2/2022 | Lobdell | |
| 2022/0339314 | A1 | 10/2022 | Lobdell | |
| 2022/0373202 | A1 | 11/2022 | Lobdell | |

FOREIGN PATENT DOCUMENTS

| | | | |
|---|---|---|---|
| JP | 3267161 A | | 11/1991 |
| JP | 2018001093 A | | 1/2018 |
| KR | 200349107 Y1 | | 4/2004 |
| WO | WO 1998/020961 | | 5/1998 |
| WO | WO 2022/032051 | | 2/2022 |
| WO | WO 2022/212877 | | 10/2022 |
| WO | WO 2022/232147 | | 11/2022 |
| WO | WO 2022/245982 | | 11/2022 |

OTHER PUBLICATIONS

PCT/US22/26353, Disinfecting Air Filtration System Configuration, Apr. 26, 2022.

PCT/US22/23108, Disinfecting Air Filtration System Configuration, Apr. 26, 2022.

U.S. Appl. No. 17/747,840, filed May 18, 2022, Vincent G. Lobdell, Fan Powered Air Filtration Unit.

PCT/US22/29885, Fan Powered Air Filtration Unit, May 18, 2022.

U.S. Appl. No. 29/813,637, filed Oct. 29, 2021, Vincent G. Lobdell, V-Bank Filter.

PCT Application PCT/US2021/044872 International Search Report and Written Opinion dated Nov. 9, 2021.

PCT Application PCT/US2022/026353 International Search Report and Written Opinion dated Jul. 28, 2022.

PCT Application PCT/US2022/023108 International Search Report and Written Opinion dated Aug. 12, 2022.

PCT Application PCT/US2022/029885 International Search Report and Written Opinion dated Jul. 28, 2022.

HHPC-005CN Chinese Application No. 202230063845 Office Action dated Jun. 2, 2022.

Extended European Search Report for European Application No. 22782314.3, mailed Sep. 9, 2024, 9 pages.

* cited by examiner

FRONT-LOADED INLINE MODULAR FILTRATION SYSTEM

CROSS-REFERENCE TO RELATED APPLICATIONS

The present application claims the priority benefit of U.S. provisional application No. 63/169,529 filed Apr. 1, 2021, the disclosure of which is incorporated herein by reference.

BACKGROUND

Field of the Disclosure

The present disclosure is generally related to the filter assemblies for air purification systems and the replacement of those filter assemblies. More specifically, the present disclosure is directed to concentrating and capturing small particles in a filter.

Description of the Related Art

Various types of air filters have been made for many years. Conventional air filters commonly rely on a flow of air that passes through a filter, where the filter traps particles that are larger than a hole size associated with the filter. As the hole size of a filter decreases, an amount of resistance to the airflow increases. This means that pumps that circulate air through an air filtration apparatus must be more powerful in order to maintain a given airflow rate when denser filters are used. This increases an amount of air pressure that a pump must provide to maintain that airflow. This means that increasing an amount of filtering capability using hole size of a filter will result in increased costs associated with operating or manufacturing an air filtering apparatus. This is because a pump may have to be provided with a larger amount of electrical power in order to maintain an air flow rate and in certain instances may force a manufacturer to replace a less powerful pump with a more powerful pump.

Another limitation of conventional air filtering apparatus is that filters contained within such apparatus are difficult to replace. Tools such as a screwdriver or wrench are often required to access and replace a filter. This means that parts such as screws or nuts that must be removed to replace a filter may be lost and this may result in air passing around instead of through an air filter system or portions thereof.

Another technique that has been used to filter air, is to charge particles in an air flow using a high electric voltage and then capture the charged particles on a surface that has a different or opposite charge. Such air filters are commonly referred to as ionizing or ionizer air purifiers. Ionizing air purifiers, however, generate ozone that is emitted into environments where people live and work. People that breathe in ozone commonly suffer from health effects that include chest pain, coughing, throat irritation, and congestion. Breathing ozone is also associated with various illnesses and increased rates of bronchitis, emphysema, and asthma.

With the emergence of new infections diseases caused by various pathogens (such as coronavirus COVID-19, antibiotic resistant bacteria, and antifungal resistant fungi), the need to filter very small particles out of the air has increased dramatically. The size of viruses range from 20 nanometers (nm) to about 5000 nm, where COVID-19 has a diameter of about 100 nm.

It is therefore desirable to have an air purification system that can continuously capture very fine particles and live organisms while minimizing the pressure drop and the amount of technical expertise required to replace consumable filters. It is also desirable to have air filtering systems that trap small particles without increasing energy use and that do not emit ozone from the air filtering system.

SUMMARY OF THE PRESENTLY CLAIMED INVENTION

The presently claimed invention is directed to an apparatus for filtering air and is directed to a method for making such an air filtering apparatus. In a first embodiment, the apparatus includes a first filtering sub-assembly that includes a first electrical interconnect that provides electricity to the first filtering sub-assembly. This apparatus may also include a receiving portion that receives the first filtering sub-assembly. The receiving portion may also include a second electrical interconnect that mates with the first electrical interconnect of the first filtering sub-assembly when the first filtering sub-assembly is received by the receiving portion. The electricity may be provided to the first filtering sub-assembly based on the mating of the first and the second electrical interconnect. This apparatus may also include a gasket that resists the air from escaping the apparatus and may include a second filtering sub-assembly that contains a pre-filter. Here, the air passes through the pre-filter and to the first filtering sub-assembly when the gasket resists the air from escaping the apparatus.

In a second embodiment, a method of the presently claimed invention includes identifying dimensions of an air duct, identifying one or more receiver sections to couple an air flow to the air duct such that an air flow is filtered, assembling the one or more receiver sections to form the array of receiver elements, and inserting a first type of filtering sub-assembly into each of the one or more receiver sections of the array of receiver elements. The insertion of each of the first type of filtering sub-assemblies into each of the one or more receiver sections results in one or more power connections being automatically connected when a second sub-assembly is formed. This method may also include attaching elements of a third filtering sub-assembly to the second sub-assembly. The elements of the third filtering sub-assembly may include one or more prefilters and the air flow may move through the one or more prefilters and to each of the first type of filtering sub-assemblies after the power connections are automatically connected. The air flow may then move within the dimensions of the air duct after the attachment of the elements of the third filtering sub-assembly.

DESCRIPTIONS OF THE DRAWINGS

FIG. 1: Illustrates a front-loaded inline modular filtration system, according to an embodiment.

DETAILED DESCRIPTION

A disinfecting filtration system (DFS), also referred to as electrically enhanced filtration (EEF) is an air purification system that uses two mechanisms to maintain high air cleaning performance. An EEF air purification system may use high energy field to facilitate the aggregation and capture of ultrafine particles. Such a system may effectively increase particle size by forming clusters ultrafine particles. Such a high energy field may be controlled in a manner that contains and captures charged particles without emitting charged particles from the filter system. Such a filtering process may be based on an "entry ground control grid" that is located before a front part of a main filter and a "rear control grid" (or "exhaust control grid") that may be affixed to a rear part of the main filter. The entry ground control grid and the rear/exhaust control grid may be tied to an Earth ground connection that prevents these grids from be energized by the high energy field. Each of the ground control grid and rear/exhaust control grid may be a screen include holes that do not allow service personnel to reach into an energized portion of a disinfecting filtration system.

Even in instances where ions generated by the high energy field, such charged particles are isolated in the main filter between the entry control grid and the rear/exhaust control grid on a rear side of the filter. The controlled, isolated high energy field generated by the EEF continually creates high energy exposure through pleats and fibers of a main filter creating a microbiostasis ("prevention of organism growth") in the main filter. This may prevent live organisms from escaping back into the air. These two mechanisms work together to provide the ultraclean filtration of particles as well as continual prevention of organism growth in the EEF filter.

A filtering apparatus may include pre-filters to remove larger particles. These pre-filters may increase the effective lifespan of electrically enhanced filters and reduce the load placed on a high voltage alternating current air conditioning (HVAC) system caused by the pressure drop. Pre-filters should be replaced more frequently than the electrically enhanced filters, and failure to do so may limit the effectiveness of the air filtration system and increase the pressure drop load placed on the HVAC system. The replacement of pre-filters should be as simple a process as possible, and ideally require little to no expertise to do so. The ease of maintenance allows for timely replacement without requiring the expense and delay of service calls. Further, the replacement of pre-filters should not require a complete shutdown of the HVAC system in order to allow continuous filtration of the air being treated.

Figure 1:
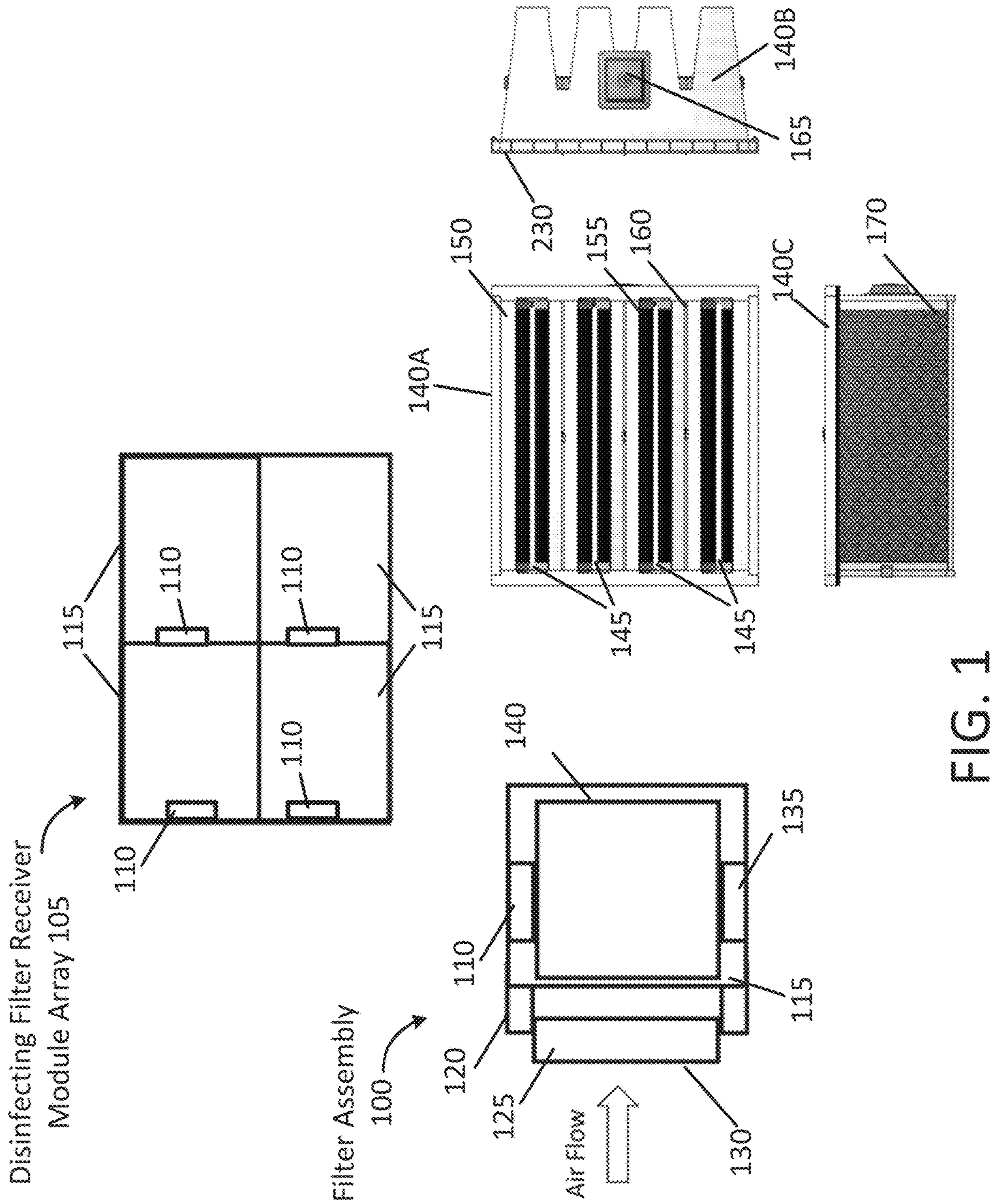

FIG. 1 illustrates a front-loaded inline modular filtration system. The system may include disinfecting filter assembly 100 that allows for quick connection of parts included in disinfecting filter array 105. Filter array that may receive a plurality of disinfecting filter modules in receiver sections 115. Each of the receiver sections 115 include may include a power control unit 110 and each receiver section 115 may receive a respective filter assembly 100 or portion thereof. Once assembled, disinfecting filter array 105 may form an electrically enhanced filtration EFF system that can maintain power to one or more filter assemblies 100 in the presence of an electrical fault in one or more other filter assembly modules. A number of filter assembly modules 115 included in such an array may only be limited by a configuration of an HVAC system into which disinfecting filter 105 assembly is being incorporated. Arrays of different sets of filters may be built using different sized receiver sections 115 such that a filter array system may be built withing or coupled to ducting of an existing air distribution (e.g. HVAC) system.

Filter assembly 100 of FIG. 1 includes power control unit 110, pre-filter frame 120, pre-filter 125, and ground contact 135. In one instance, the disinfecting filter array 105 may include an array of some number of filter assembly modules 100 that are of a uniform size. In other instances, there may be variations in the size of a filter assembly 110, this may allow installers to fill and seal filter assemblies within a ducting space used in a given application. Each filter assembly module 100 may be mounted in or attached to the disinfecting filter array 105. A parallel power supply may provide electrical power to the control units 110 in each of the receiver sections 115 and each respective control unit 110 may provide power to a respective V-Bank filter 140 when a high-energy field is generated inside the V-Bank filter 140 and in filter media of the V-Bank filter 140.

The filter assembly 100 may have an alignment pin, slots, and/or holes that ensure the pre-filter frame 120 is properly aligned when the pre-filter frame 120 is mounted to the filter assembly 100. Such alignment pins, slots, and/or holes and quick connect mechanical interconnects may ensure that the V-Bank filter 140 is secured in the filter assembly 100 when the pre-filter frame 120 is inserted. A respective pre-filter frame 120 may mount to the front of each filter assembly 100 in the disinfecting filter array 105 of FIG. 1. The pre-filter frame 120 may serve two functions, a first function that serves as a mounting point for pre-filters 125 and a second function that serves as a sealing mechanism that may use a gasket that is compressed when a filter array is used. The first function may allow the pre-filter (and/or the V-bank filter 140) to be replaced without the need for tools. The sealing function may direct air entering pre-filter 125 directly into V-Bank filter 140 to prevent air from bypassing V-Bank filter 140. A sealing gasket may be a separate piece that is held in place by the pre-filter frame 120.

Pre-filter 125 may be a filter that captures large particles before they may enter the V-Bank filter 140. In certain instances, pre-filter 140 may be selected to capture particles larger than a particular size, for example, pre-filter 125 may be selected to provide a minimum efficiency reporting filtration value (MERV) rating of at least MERV 8. The minimum size of particles captured by the prefiltration process can vary depending upon a given application, a desired air flow, and/or a resistance to the air flow capacity of a particular high voltage air conditioning (HVAC) system. FIG. 1 includes a large arrow labeled "Air Flow," this arrow illustrates air flowing into filter assembly 100 through pre-filter 125.

FIG. 1 also includes three different views of V-Bank filter 140 included in filter assembly 100. These three different views include V-Bank filter front view 140A, a second V-Bank filter view 140B, and a third view of the V-Bank filter 140C. Parts that may be included within a V-Bank filter include high voltage wires 145, an entry control grid, a high energy transfer grid, ground bar 160, power contact pad 165, and a rear control grid 170. Items 150 and 155 identify locations respectively where an entry control grid and a high energy transfer grid may be located. The entry control grid may have a surface that is like a screen, chicken wire, or a plate perforated with holes that prevents a person from touching high energy wires 145 or other energized components (e.g. the high energy transfer grid) within the V-Bank filter. Rear control grid 170 may also have a surface like a screen, chicken wire, or perforated plate and as mentioned above the entry control grid and rear control grid may be grounded. The high energy transfer grid may be charged to a high voltage and this grid may be in close proximity to filter elements included in a V-Bank filter assembly.

Power may be routed to high energy wires 145 of a respective V-Bank filters from a respective power control unit 110 via power contact 145 and connecting wires or high energy transfer grids. Ground contact 135 may be used to provide an Earth ground connection to a frame or electrical connector of the respective V-Bank filter. Note the scale of three different V-Bank filter views 140A, 140B, and 140C of FIG. 1 is slightly different than the scale of the V-Bank filter 140 in filter assembly 140. In certain instances, a power connector may couple electrical power from power control unit 110 to power contact pad 165 when V-Bank filter 140 is slid into filter assembly 110. At this time ground contact 135 may ground the frame of V-Bank filter. A respective V-Bank filter 140 may be slid into a respective receiver slot 115 using rails or protrusions/slots not illustrated in FIG. 1. After aligning a V-Bank filter assembly with a receiver section, the act of sliding the V-Bank filter assembly into a receiver section may result in power and ground connections being formed automatically between based on the alignment of couplings that transfer power and ground from the receiver section to the V-Bank filter assembly.

Power a control unit 110 may activate a high energy field by delivering a voltage to a to a high-voltage contact or wires connected to high energy wires 145. Voltages provided to the high energy wires 145 may be high enough to generate a high energy field within V-Bank filter 140 such that the high energy filed may be provided to filter media inside of V-Bank filter 140.

In certain instances, a high-voltage contact may be located on the top of a filter assembly 100. Such a contact may be configured to allow for quick connection of power to a V-Bank filter. When a V-Bank filter 140 is inserted into a receiver section 115, this high-voltage contact may be configured to contact contact pad 165 to conduct electricity from the control unit 110 to the high energy wire 145 via metallic elements of contact pad 165. In such an instance, the V-Bank filter 140 may be inserted into filter assembly 100 in an orientation where contact pad is located at the top of the filter assembly 100. Here, ground contact 135 may be located on the bottom of the filter assembly 100 such that when the V-Bank filter 140 is inserted into the receiver section 115, the ground contact 135 may contact ground bar 128 to ground the V-Bank filter 140. In this way, V-Bank filter 140 may be configured to drop or slide into a receiver part 115 of filter assembly 100 without the need for a person to manually wire the power to the V-Bank filter 140.

In certain instances, a V-Bank filter may user filter media that is a lesser dense media (for example 97 DOP) as compared to a standard HEPA filter (99.97 DOP). This may allow the filter media to have a higher gram holding weight and thus allow the filter media to hold more dust as compared to a standard HEPA filter. The high energy field provided to the V-Bank filter and filter media may allow for the less dense filter media to capture smaller particles based on clumping effects associated with the design of the V-Bank filter and the high energy field generated inside the V-Bank filter. Because of this and because of the pre-filter, each of the filters included in filter assembly 100 may have an increased usable time span. HEPA filters also offer higher resistance as compared to V-Bank filters that use lesser dense filter media. This means that a pressure drop associated with such a V-Bank filter can approach almost a quarter of the pressure drop experienced when denser HEPA filters are used. This means that a filter system built in a manner consistent with the present disclosure may filter as or more effectively than a HEPA filtration system while providing benefits of less pressure drop and/or lower energy use. For example, at a time of installation, a HEPA system may experience a pressure drop of 1.0 inches of Mercury as compared a pressure drop of 0.25 to 0.30 inches of Mercury of a V-Bank filtration system.

Here the filter media fibers of filter elements are continually being exposed to the high energy field that create microbiostatis effects in the filter media. The result, depending on the efficiency of the traditional media used, is as follows: much higher particulate efficiency than traditional media filters and with fan-powered machines, a 99.99% at 0.007-micron filtration efficiency, with a greater gram holding weight capacity, resulting in a greater lifetime performance and less maintenance and energy cost. The technology has been proven to enable a penetration reduction of 2-3 orders of magnitude. In certain instances, HEPA or other denser filter media may be used in a V-Bank filtration system, this however, may increase energy costs because of the greater pressure drops associated with use of higher density filters.

As discussed above, contact pad 165 is located on an exterior surface of V-Bank filter 140 where contact pad 165 may be configured to directly contact a high-voltage contact included in receiver part 115. This allows power to be coupled from power control unit 110 to the V-Bank filter via contact pad 165 without a person touching power interconnections.

During the filtration process, 0.007-micron substances may be captured and degraded with a 12-16 thousand volt (KV) field provided by the high energy transfer grids 124. The high-energy transfer grids may cover 95% of an area of a filter media, only slightly increasing the resistance of the B-Bank filter 140. A V-Bank filter may include a number of rear ground control grids 170. In the V-Bank filter 140 of FIG. 4, there are eight rear ground control grids 170, one located on an exit side of each filter element on opposite sides of a V-Bank filter bank. The side view of V-Bank filter 140B includes four V-Bank filter banks. Each of these filter banks may have a first filter element and a second filter element, where a first (top) part of the first filter element and a first (top) part of the second filter element are separated by a first distance that is greater than a second distance that separates a second (bottom) part of the first filter element and a second (bottom) part of the second filter element. Because of this each of the filter elements included in a bank of filter elements may be arranged in a V like shape. Rear control grids on particular V-Bank filter elements may be glued to the filter media and may be grounded by an electrical connection to ground bar 160. The rear ground control grid 170 helps to contain particles in the media. The rear ground control grid 170 may also eliminate electrostatic field effects in areas outside the filter media. Read ground control grid 170 may therefore prevent electrostatic fields and any charged particles from exiting the V-Bank filter. Note that high energy wires 145 are located near an air input of the V-Bank filter and the rear control grid 170 is located near an air output of the V-Bank filter.

Figure 2:
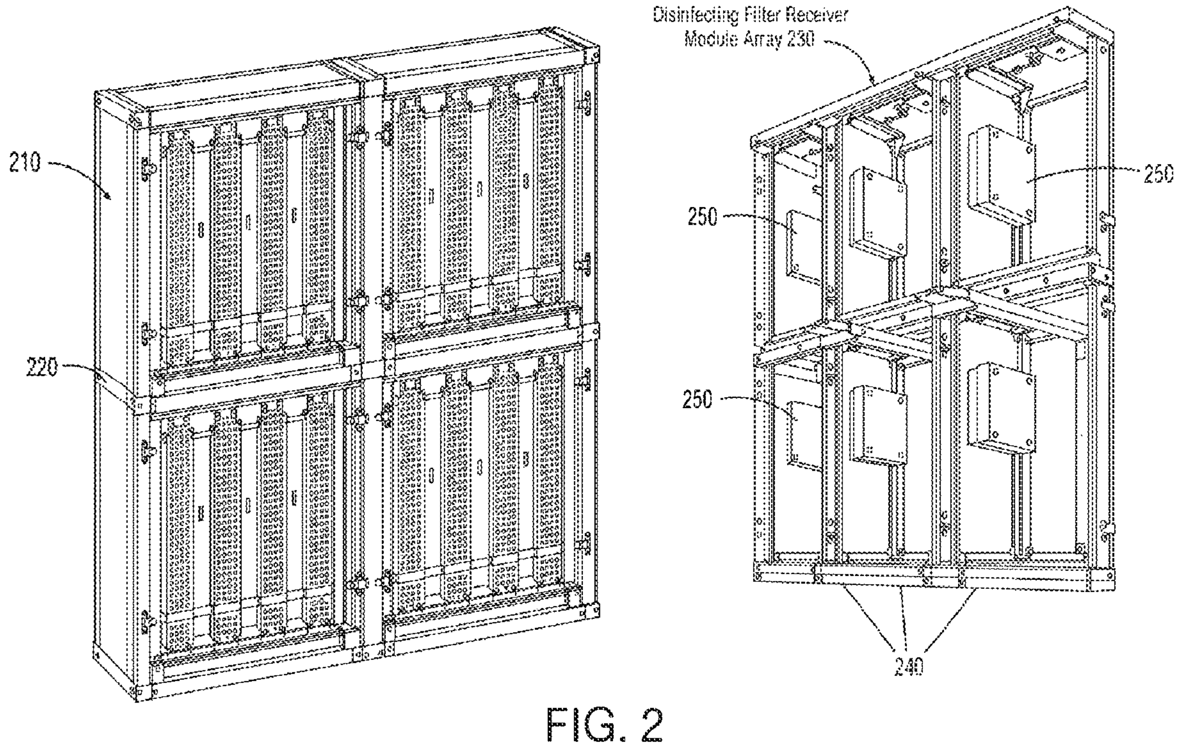
FIG. 2 illustrates parts that may be included in a disinfecting filter array.
Figure 4:
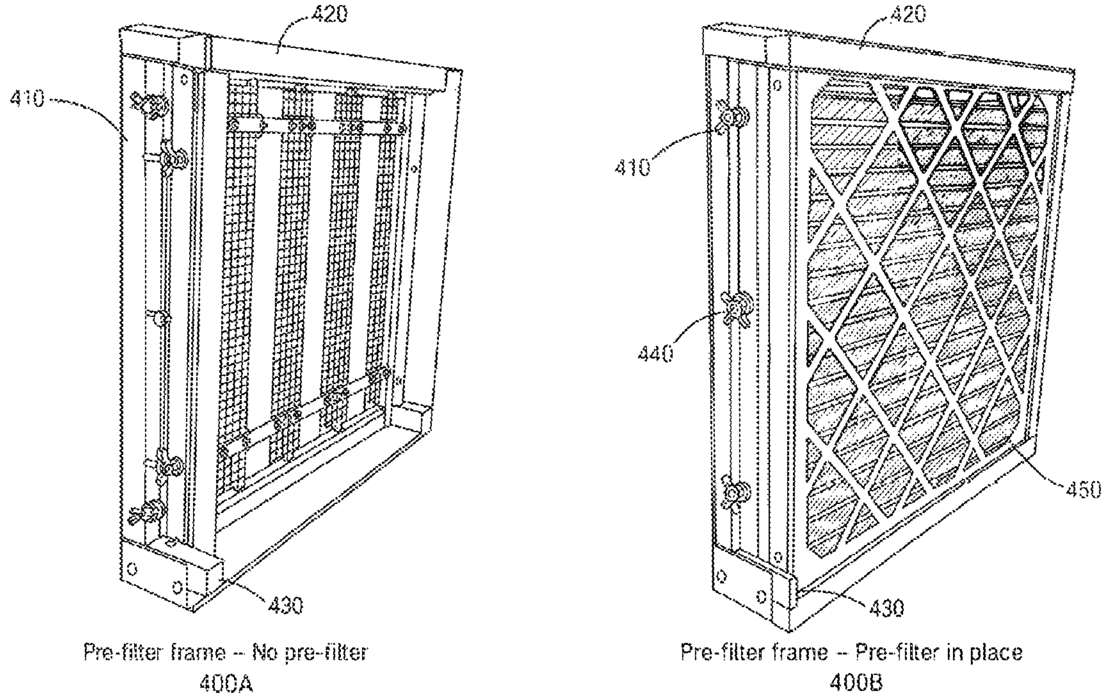
FIG. 4 illustrates two views of a pre-filter frame where a first view of the pre-filter frame does not include a pre-filter element and where a second view of the pre-filter frame does include the pre-filter element.

FIG. 2 illustrates parts that may be included in a disinfecting filter array. FIG. 2 includes a set of 4 pre-filter frames 210 that do not currently have pre-filters installed. When pre-filters are installed in pre-filter frames 210, they may be placed within features 220 of pre-filer frame 210 as illustrated in FIG. 4. FIG. 2 also includes disinfection filter receiver array 230 that may receive filter modules such as the V-Bank filter 140 of FIG. 1. Filter receiver array 230 may be the same type of array as the disinfection filter receiver array 105 of FIG. 1. Note that filter receiver array 230 includes receiver portions 240 that are similar to receiver sections 115 of FIG. 1. Receiver portions 240 may be built to receive a filter assembly that includes a V-Bank filter 140 like filter assembly 100 of FIG. 1. Each of the 6 receiver portions 240 included in FIG. 2 include a power control unit 250. Here again, V-Bank filters may be installed into receiver portions 240 when a disinfecting filter unit is installed.

Figure 3:
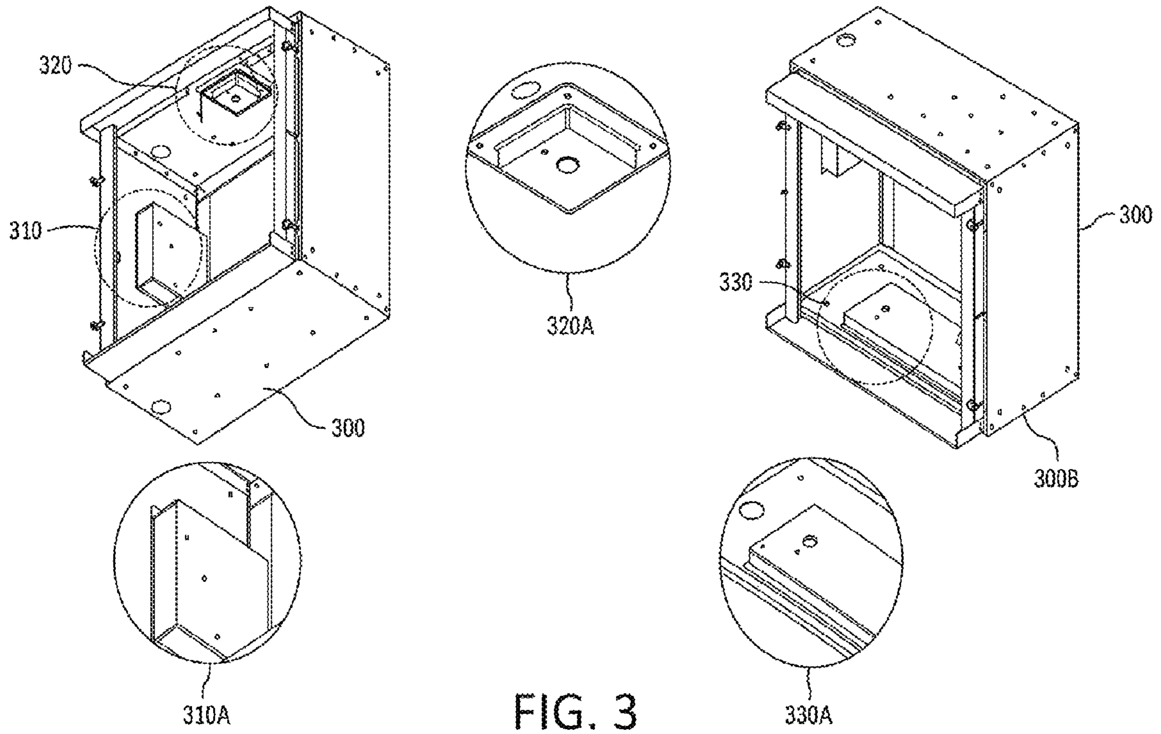
FIG. 3 illustrates different perspective views of an example of the filter receiver section that may be included in a disinfecting filter assembly.

FIG. 3 illustrates different perspective views of an example of the filter receiver section that may be included in a disinfecting filter assembly. The filter receiver section 300 of FIG. 3 may be the same type of assembly as the receiver sections 115 of FIG. 1 or receiver portions 240 of FIG. 2. FIG. 3 includes a first perspective view 300A and a second perspective view 300B of receiver section 300. Perspective view 300A includes a power contact pad 320 and a power control element 310 where perspective view 300B includes ground contact 330. FIG. 3 also includes exploded views 310A, 320A, and 330A that respectively show views of power contact pad 320, power control element 310, and ground contact 330. When a V-Bank filter is slid into receiver section 300, power and ground contacts of the V-Bank filter may respectively electrically connect to power contact pad 320 and ground contact 330 of FIG. 3 such that power control unit 310 can provide a high voltage to the V-Bank filter. Here again the installation of the V-Bank filter may not require tools.

FIG. 4 illustrates two views of a pre-filter frame where a first view of the pre-filter frame does not include a pre-filter element and where a second view of the pre-filter frame does include the pre-filter element. View 400A of FIG. 4 illustrates pre-filter frame 410 when a filter is not installed and View 400B of FIG. 4 illustrates pre-filter frame 410 when filter 450 is installed. These images also include retention features 420 and 430. FIG. 400B also includes quick connects/disconnects 440 that may be used to latch pre-filter frame 410 onto a filter assembly without tools.

The pre-filter frame 410 may be secured to the filter assembly module 104 by hand-turn-able fasteners or other types of quick connect fasteners. Exemplary fasteners may be seen in element 440 of FIG. 4. When a quarter turn is applied to the fasteners 400, they compress spaces between sections of a filter apparatus. This compression may create an airtight seal between the V-Bank filter 140 and a prefilter frame 140, while also creating a grounded contact between the ground bar 128 and the prefilter frame 140 of FIG. 1. Fasteners 440 are not limited to the quarter-turn hand fastener but may include other styles of clamps, such as spring-loaded, screw-type, other mechanical fasteners, magnetic fasteners, snap-on connectors, etc. Such connectors may facilitate the forming of an airtight seal between while also creating a grounded contacts between respective parts of the filter assembly. Quick connect fasteners may be used to attach and retain different parts of a filter apparatus together so those different parts may be disassembled and serviced without using tools.

As an example of operation, a user may wish to install or exchange a lift and pull pre-filter. To do so, the user may turn fasteners 440 by one quarter turn to unseal pre-filter frame from another part of the filter assembly. A pre-filter may be tilted and removed from filter frame 410. This may allow a user to access to a V-Bank filter when a V-Bank filter is replaced or serviced. A new V-Bank filter or filter elements of a V-Bank filter may be replaced. The V-Bank filter may then be inserted back into a receiver section of the overall filter assembly and be secured to the filter pre-filter frame 140 to create a seal. This process may include use of alignment pins, holes, or rails. Once pre-filter frame 140 is in place, the user may turn fasteners 440 by one quarter turn to re-seal the filter assembly.

Figure 5:
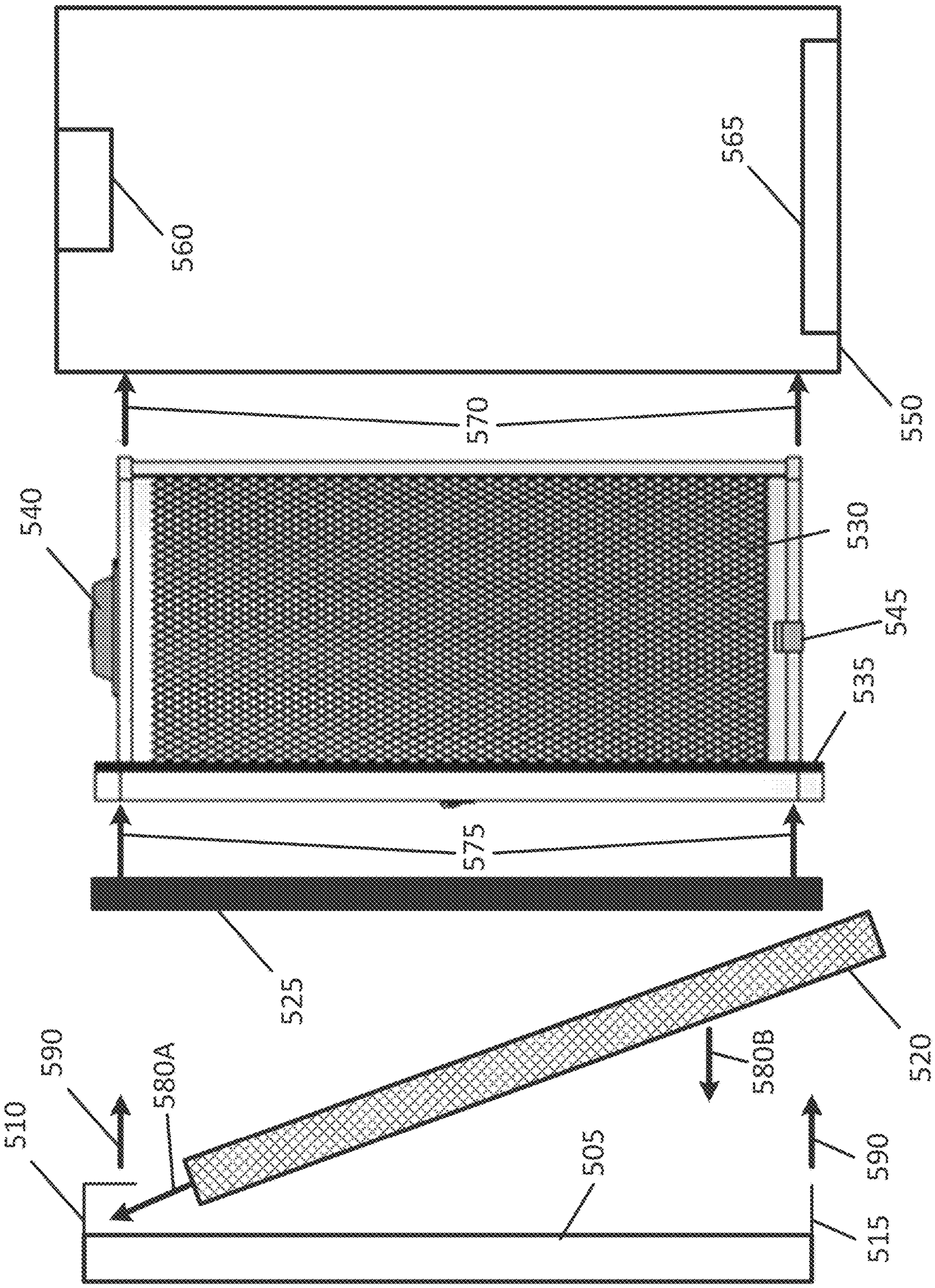
FIG. 5 illustrates parts that may be included in a filter assembly.

FIG. 5 illustrates parts that may be included in a filter assembly. FIG. 5 also illustrates how these parts may be assembled into an assembly. FIG. 5 includes pre-filter frame 505, pre-filter 520, gasket 525, V-Bank filter assembly 530, and receiver section 550. Pre-filter frame includes receiving features 510 & 515 that may be used to receive pre-filter 520. FIG. 5 also illustrates several parts that may be included in V-Bank filter 530, these parts include a second gasket 535, power contact pad 540, and ground contact 545. The receiver portion 550 of FIG. 5 includes power contact 560 and ground contact 565 that may each be a form of electrical power connector.

Assembly of the filter assembly of FIG. 5 may include the steps of sliding V-Bank filter 530 into receiver section 550 along arrows 570. This sliding or relative motion allows for the quick and easy assembly of a filter apparatus. When the V-Bank filter 530 is slid into receiver section 550 power contact pad 540 of the V-Bank filter 530 may make electrical contact with power pad 560 of the receiver portion 550 and ground contact 545 of V-Bank filter 530 may make electrical contact with ground contact 565 of receiver section 550. Once V-Bank filter 530 and receiver section 550 are coupled together, the various power contacts (540 & 560) and ground contacts (545 & 565) may make both power and ground connections such that filter elements of the V-Bank filter 530 may be energized. The seal 535 of V-Bank filter 530 may be an optional gasket that forms a seal between portions of the V-Bank filter 530 and receiver section 550.

Gasket 525 may be coupled to a portion of V-Bank filter 30 as indicated by arrows 575. Pre-filter 520 may be slid into receiving features 515 and 510 by moving pre-filter 520 along directions indicated by arrows 580A and 580B. Once installed, the receiving features 510 and 515 of pre-filter frame may hold the pre-filter 520 in place. Next the pre-filter frame may be moved along arrows 590 when assembly of the filter of FIG. 5 is completed.

Once this filter assembly is assembled and turned on, gasket 525 and optional gasket 535 may prevent air entering the filter assembly from bypassing V-Bank filter 530. The various parts illustrated in FIG. 5 may be connected together using quick connect connections of any sort.

Note that V-Bank filter 530 may be referred to as a first sub-assembly that fits into receiving section 550 to form a second sub-assembly. Pre-filter frame 505 and pre-filter 520 may be considered as elements of a third sub-assembly that is attached to the second-sub assembly when an overall filter assembly is assembled.

Figure 6:
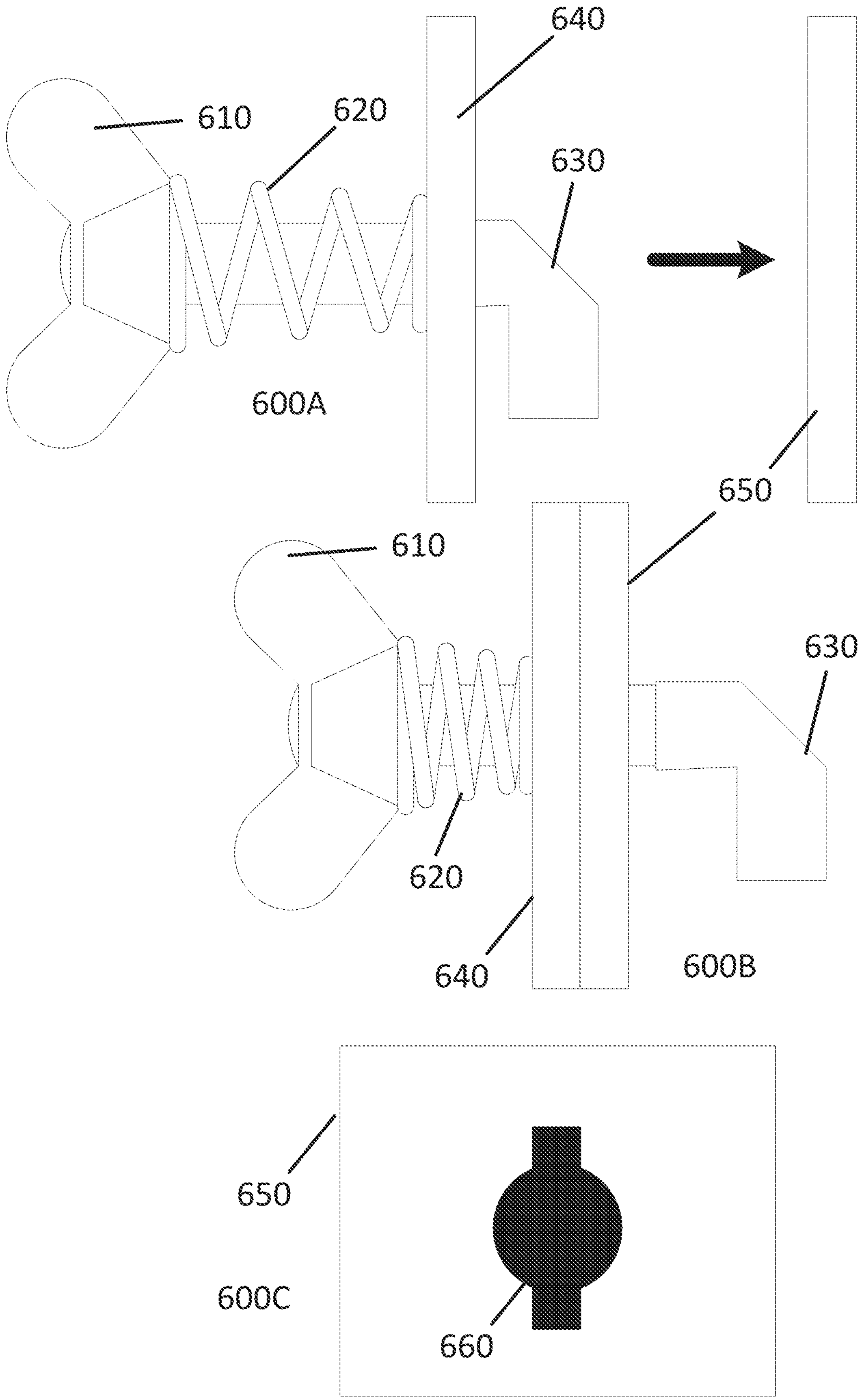
FIG. 6 illustrates three different views of parts that may be used to quickly connect different parts of a filter assembly together.

FIG. 6 illustrates three different views of parts that may be used to quickly connect different parts of a filter assembly together. The assembly of FIG. 6 is representative of couplings that may be used to attach, detach, and reattach two different parts of a filter assembly together.

On the top of FIG. 6 is view 600A that includes wing bolt 610, metal plate 640, and metal plate 650, where a spring 620 is not in a fully compressed state. Wing bolt 610 may include a shaft that extends from wings of wing bolt 610 to a key like shaped portion 630 of wing bolt 610. Here the right side of spring 620 may be permanently attached to metal plate 640. Spring 620 may encircle a shaft of wing bolt 610.

In one instance, metal plate 640 may be a piece of a pre-filter frame, such as pre-filter frame 410 of FIG. 4 and metal plate 650 may be a piece of sheet metal of a receiver portion or a V-Bank portion of a filter assembly. The arrow of FIG. 6 illustrates motion of an assembly that includes metal plate 640 and wing bolt 610 when two different pieces of a filter assembly are attached to each other.

The middle view 600B of FIG. 6 illustrates that after metal plate 640 and 650 contact each other that spring 620 may be compressed after the key portion 630 of wing bolt 610 has passed through a hole in metal portion 650. In certain instances, a gasket may be placed between metal plate 640 and metal plate 650. The bottom view 600C of 6 includes metal plate 650 and hole 660. Once wing bolt 610 has been aligned with hole 660, the wing bolt 610 may be pressed forward through hole 660 and be compressed spring 620. Next, wing bolt 610 may be turned to a position where the key portion 630 of wing bolt 610 grabs onto a portion of metal plate 650 to couple metal plate 640 to metal plate 650. At this point in time, spring 620 may provide a force that maintains coupling of metal plate 640 to metal plate 650. In certain instances, a gasket (not illustrated in FIG. 6) may be located between metal plate 640 and metal portion 650.

Figure 7:
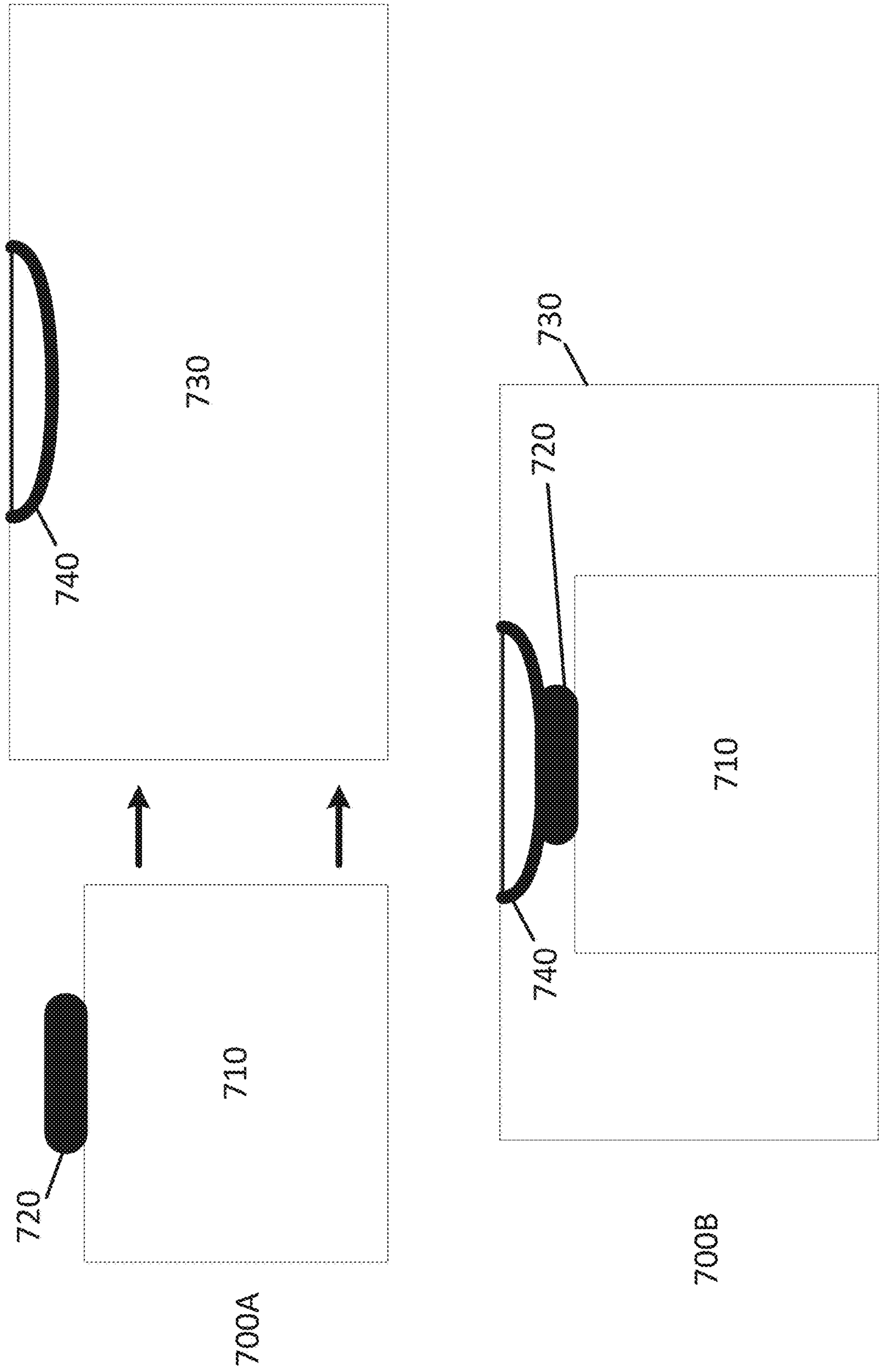
FIG. 7 illustrates two electrical interconnects that mate to transfer electrical energy between a receiver section and a sub-assembly of a filter assembly.

FIG. 7 illustrates two electrical interconnects that mate to transfer electrical energy between a receiver section and a sub-assembly of a filter assembly. FIG. 7 includes a first connector 710 that includes electrical contact 720 and includes a second connector 730 that includes electrical contact 740. Connector 710 is representative of electrical connectors of a V-Bank filter assembly (i.e. power contact pad 540 or ground contact 545) discussed in respect to FIG. 5. Connector 730 is representative of electrical connectors of a receiver section (i.e. power contact pad 320 or ground contact 330) of a filter assembly. FIG. 7 includes an upper set of images 700A where connector 710 is being moved toward connector 730 when a filter sub-assembly (i.e. V-Bank filter 530 of FIG. 5) is inserted into a receiver section of a filter assembly.

FIG. 7 also includes a lower set of images 700B that illustrates connector 710 and connector 730 in a mated position. Note that in this mated position metallic contact 720 of connector 710 physically contact metallic contact 740 of connector 730. FIG. 7 illustrates that electrical contacts built into different parts of a filter apparatus may form an electrical quick connect system that provides electrical energy and grounding to connectors without requiring a user to manipulate power contacts with their hands. Instead, a user may only have to align two sub-assemblies (e.g. between a first filter sub-assembly and a receiver section of a filter assembly) and slide those two sub-assemblies together in a manner electrical connections between the two different sub-assemblies are formed automatically.

Electrical power provided to a first filter sub-assembly (e.g. a V-Bank filter assembly) may be a high direct current voltage. In such instances, current passed through metallic contacts 720 and 740 may be limited. Metallic contacts 720 and 740 may provide electrical energy from a power control unit such as the power control units 110, 250, & 310 discussed in respect to FIGS. 1-3.

Figure 8:
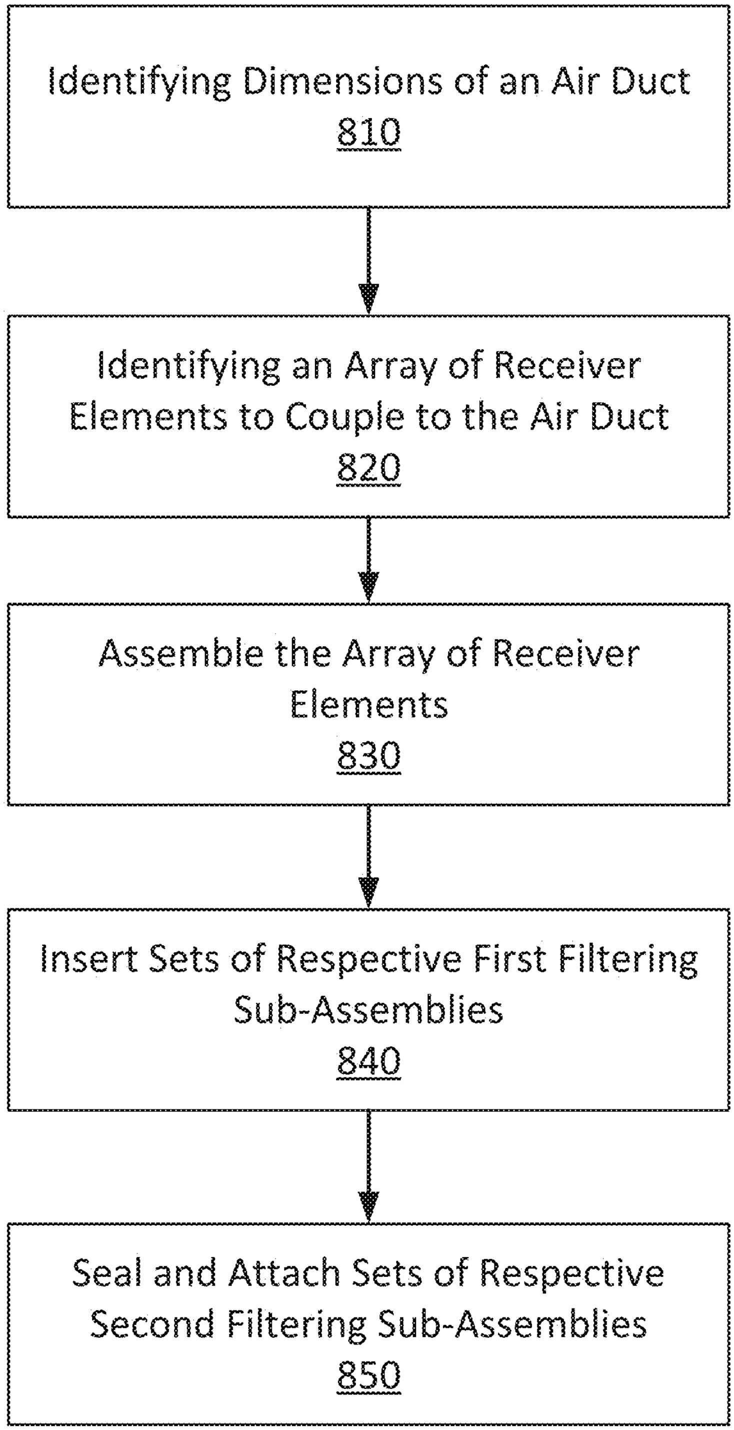
FIG. 8 illustrates a series of steps that may be performed when an inline modular filtration system is installed.

FIG. 8 illustrates a series of steps that may be performed when an inline modular filtration system is installed. FIG. 8 begins with step 810 where dimensions of an air duct are identified. Next, a number of filter units that could be included in an air filter system built within or coupled to the air duct may be identified in step 820. Step 820 may include identifying sizes of particular filter units that to adapt into the air filter system. This may include identifying receiver sections of different sizes such that an array of filter elements may be assembled within an area associated with the air duct dimensions identified in step 810.

Step 820 may include identifying one or more receiver sections to couple an air flow to the air duct such that an air flow can be applied based on the identified air duct dimensions. Next in step 830 different receiver sections may be assembled and then in step 840, respective sets of filtering sub-assemblies may be installed (e.g. slid) within or attached to respective the receiver sections assembled in step 830. These sub-assemblies may be respective different assemblies that include elements of the V-Bank discussed in respect to FIG. 1. Step 840 may result in a second filtering sub-assembly being formed that includes the one or more receiver sections and respective sets of a first type of filtering sub-assembly, such as a V-Bank filter.

After step 840 sets of pre-filter assemblies (or sub-assemblies) and gaskets may be installed in step 850. These pre-filter assemblies may be mechanically coupled directly to framing elements of the filter assemblies that were attached into the receiver sections. Additionally, or alternatively the pre-filter assemblies may be mechanically coupled to the receiver sections directly. Gaskets used in step 850 may prevent air from bypassing the filter assemblies that were attached to the receiver sections.

Each respective receiver section may be mechanically attached to respective filtering sub-assemblies and/or to a respective pre-filter assembly using the quick connects discussed in respect to FIG. 6 or other types of mechanical quick connects. These quick connects may allow for specific sections of an array of filter elements to be serviced easily and independently.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. An apparatus for filtering air, the apparatus comprising:

a power supply configured for providing electrical power;

a power control unit configured for controlling delivery of electrical power from the power supply to an electrical component;

a removable first filtering sub-assembly that includes a first electrical interconnect comprising a power contact pad configured to receive electrical power from the power control unit and to provide the received electrical power to an electrical component of the first filtering sub-assembly, and a third electrical interconnect comprising a ground contact;

a receiving portion comprising a receiver section configured to receive the first filtering sub-assembly into a position within the apparatus based on a sliding relative motion between the first filtering sub-assembly and the receiving portion, the receiving portion including a second electrical interconnect comprising a power contact that automatically mechanically and electrically mates with the first electrical interconnect of the first filtering sub-assembly when the first filtering sub-assembly is received by the receiving portion into the position based on the sliding relative motion to place the first and second electrical interconnects into a mated position, and a fourth electrical interconnect comprising a ground contact that automatically mechanically and electrically mates with the third electrical interconnect based on the sliding relative motion, wherein the power control unit is located on the receiving portion and is electrically connected to the second electrical interconnect and wherein an electrical connection between the power control unit and the first filtering sub-assembly is automatically established based on the mating of the first and the second electrical interconnect without manual manipulation of power contacts;

a gasket that, when the first filtering sub-assembly is received by the receiving portion into the position, is compressed between the first filtering sub-assembly and the receiving portion and resists the air from escaping the apparatus; and a second filtering sub-assembly that contains a pre-filter, wherein the air passes through the pre-filter and to the first filtering sub-assembly when the gasket is compressed between the first filtering sub-assembly and the receiving portion and resists the air from escaping the apparatus.

2. The apparatus of claim 1, further comprising a mechanical quick connect configured to retain attachment of the second filtering sub-assembly after the first filtering sub-assembly is received from the receiving portion.

3. The apparatus of claim 1, further comprising a mechanical quick connect that retains attachment of the first filtering sub-assembly to the receiving portion that receives the first filtering sub-assembly.

4. The apparatus of claim 3, further comprising a second mechanical quick connect that retains attachment of the second filtering sub-assembly after the first filtering sub-assembly is received from the receiving portion.

5. The apparatus of claim 1, wherein the electrical component of the first filtering sub-assembly includes an electrical wire that receives the electricity to charge particles in the air as the air passes into an input of the first filtering sub-assembly based on the electrical wire being located at the input of the first filtering sub-assembly, and the apparatus further comprising:

a filter located in proximity to an output of the first filtering sub-assembly.

6. The apparatus of claim 1, further comprising one or more additional receiving portions, that each include a respective power control unit, each of the one or more additional receiving portions being configured to receive a respective additional first filtering sub-assembly and being coupled to a respective additional second filtering sub-assembly.

7. The apparatus of claim 6, wherein the one or more additional receiving portions are physically connected and configured to fit into an air ducting system.

8. The apparatus of claim 1, further comprising:

a first filter element and a second filter element that are located within the first filtering sub-assembly, wherein a first part of the first filter element and a first part of the second filter element are separated by a first separation distance that is greater than a second separation distance that separates a second part of the first filter element and a second part of the second filter element; and an electrical wire that receives the electricity to charge particles in the air as the air passes into an input of the first filtering sub-assembly based on the electrical wire being located at the input of the first filtering sub-assembly.

9. The apparatus of claim 8, wherein the first filter element and the second filter element form a V shape based on the first separation distance being greater than the second separation distance.

10. The apparatus of claim 9, wherein the first separation distance is associated with a first location that is closer to the input of the first filtering sub-assembly than a second location that is farther from the input of the first filtering apparatus.

* * * * *